(12) United States Patent
Schmeichel

(10) Patent No.: US 8,783,756 B2
(45) Date of Patent: Jul. 22, 2014

(54) TARP COVER SYSTEM REAR ARM ASSEMBLY FOR USE WITH THREE-PIECE TAILGATE

(75) Inventor: Jay A. Schmeichel, Bismarck, ND (US)

(73) Assignee: Bismarck Canvas, Inc., Bismarck, ND (US)

( * ) Notice: Subject to any disclaimer, the term of this patent is extended or adjusted under 35 U.S.C. 154(b) by 338 days.

(21) Appl. No.: 13/413,068

(22) Filed: Mar. 6, 2012

(65) Prior Publication Data

US 2013/0234466 A1 Sep. 12, 2013

(51) Int. Cl.
B60J 7/08 (2006.01)

(52) U.S. Cl.
CPC .................................. B60J 7/085 (2013.01)
USPC .................................... 296/100.14

(58) Field of Classification Search
CPC ............. B60J 7/085; B60P 7/02; B60P 7/04; B62D 33/027; B62D 33/0273; E05Y 2900/544; E05Y 2900/546
USPC ........ 105/377.01, 377.02; 160/69, 70, 71, 78, 160/79, 80; 296/98, 100.01, 100.11, 100.14
See application file for complete search history.

(56) References Cited

U.S. PATENT DOCUMENTS

| | | | | | |
|---|---|---|---|---|---|
| 4,302,043 | A | * | 11/1981 | Dimmer et al. | 296/98 |
| 4,380,350 | A | * | 4/1983 | Block | 296/98 |
| 4,505,512 | A | * | 3/1985 | Schmeichel et al. | 296/98 |
| 4,658,877 | A | * | 4/1987 | Quinn | 160/46 |
| 4,691,957 | A | * | 9/1987 | Ellingson | 296/98 |
| 5,002,328 | A | * | 3/1991 | Michel | 296/98 |
| 5,292,169 | A | * | 3/1994 | O'Brian | 296/98 |
| 5,466,030 | A | * | 11/1995 | Harris et al. | 296/98 |
| 6,199,935 | B1 | * | 3/2001 | Waltz et al. | 296/98 |
| 6,206,449 | B1 | * | 3/2001 | Searfoss | 296/98 |
| 6,318,790 | B1 | * | 11/2001 | Henning | 296/98 |
| 6,457,622 | B2 | * | 10/2002 | Henning | 296/98 |
| 6,513,856 | B1 | * | 2/2003 | Swanson et al. | 296/98 |
| 6,527,331 | B2 | * | 3/2003 | Searfoss | 296/100.18 |
| 6,575,519 | B2 | * | 6/2003 | Henning | 296/98 |
| 6,783,168 | B2 | * | 8/2004 | Searfoss | 296/98 |
| 6,893,071 | B2 | * | 5/2005 | Chabot | 296/98 |
| 6,942,274 | B2 | * | 9/2005 | Henning | 296/98 |
| 6,983,975 | B2 | * | 1/2006 | Morrow | 296/100.1 |
| 7,111,891 | B2 | * | 9/2006 | O'Brian et al. | 296/98 |
| 7,188,887 | B1 | * | 3/2007 | Schmeichel | 296/98 |
| 7,195,304 | B1 | * | 3/2007 | Schmeichel | 296/98 |
| 7,246,838 | B2 | * | 7/2007 | Searfoss | 296/100.01 |
| 7,513,561 | B2 | * | 4/2009 | Royer | 296/98 |
| 7,726,720 | B2 | * | 6/2010 | Searfoss | 296/100.01 |
| 8,579,011 | B2 | * | 11/2013 | Katada | 160/370.22 |
| 8,608,223 | B2 | * | 12/2013 | Taylor et al. | 296/98 |

(Continued)

FOREIGN PATENT DOCUMENTS

WO    WO 2009089333 A1 * 7/2009 ................ B60J 7/08

Primary Examiner — Glenn Dayoan
Assistant Examiner — Paul Chenevert
(74) Attorney, Agent, or Firm — Antoinette M. Tease

(57) ABSTRACT

A rear arm assembly for a tarp cover system comprising a main roller arm, the rear arm assembly comprising a first arm that is secured to the main roller arm of the tarp cover system by a first connecting member, a second arm that is pivotally attached to the first arm, and a third arm that is connected to the second arm by a second connecting member that is curved at a roughly ninety-degree angle. The rear arm assembly is not attached to the tailgate at any point other than at the mounting bracket.

17 Claims, 21 Drawing Sheets

(56) References Cited

U.S. PATENT DOCUMENTS

| | | | |
|---|---|---|---|
| 2005/0057068 A1* | 3/2005 | Searfoss | 296/98 |
| 2006/0049657 A1* | 3/2006 | Searfoss | 296/100.01 |
| 2008/0042466 A1* | 2/2008 | Searfoss | 296/100.01 |
| 2013/0249236 A1* | 9/2013 | Smith et al. | 296/98 |
| 2013/0300147 A1* | 11/2013 | Schmeichel et al. | 296/98 |
| 2014/0013994 A1* | 1/2014 | Vande Sande | 105/377.02 |

* cited by examiner

TARP COVER SYSTEM REAR ARM ASSEMBLY FOR USE WITH THREE-PIECE TAILGATE

BACKGROUND OF THE INVENTION

1. Field of the Invention

The present invention relates generally to the field of tarp covers for trucks, and more specifically, to a rear arm assembly for a tarp cover system that can be used with a three-piece tailgate on a farm truck, dump truck, or similar vehicle.

2. Description of the Related Art

The present invention is a rear arm assembly for a side-to-side tarp cover system for a farm truck, dump truck or similar vehicle with a three-piece tailgate of the type shown in FIG. 1. There exist a number of side-to-side tarp cover systems for trucks, some of which are manually operated and others of which are electronically operated. Among the electronically operated tarp cover systems are those depicted in U.S. Pat. Nos. 6,199,935, 6,206,449 and 6,513,856, discussed below. An example of a manually operated side-to-side tarp system is described in U.S. Pat. No. 7,513,561, also discussed below. Unlike the present invention, none of these systems is specifically designed to work with a three-piece tailgate.

U.S. Pat. No. 6,199,935 (Waltz et al., 2001) discloses a flexible sheet cover apparatus for a load-carrying box on a land vehicle in which an arm is coupled to a roller for rolling and unrolling the flexible sheet from side to side. The arm is in the form of a box beam with a fixed length, and the arm has a slot. A pin is coupled to the load-carrying box and slidably engaged in the slot in the arm to define a pivot for the arm. The roller remains in constant contact with the top edges of the two non-contiguous walls that form the load-carrying box. A motor is fixed to the arm between the roller and the slot, and a drive unit enclosed within the box beam couples the motor to the roller.

U.S. Pat. No. 6,206,449 (Searfoss, 2001) provides an apparatus for extending and retracting a cover over a bed of a truck. The main arm, which is located at the rear of the truck bed, has a first base and a first extension. The bearing arm, which is located at the front of the truck bed, has a second base and a second extension. The first extension is pivotally connected to the upper end of the first base, and the second extension is pivotally connected to the upper end of the second base. A reel extends between distal ends of the first and second extensions. A motor is mounted on the distal end of either the first or second extension and is also connected to the distal end of the reel. U.S. Pat. No. 6,527,331 (Searfoss, 2003) utilizes a similar arm assembly.

In three other Searfoss patent filings, the inventor depicts an arm assembly for a flexible tarp cover of a truck trailer in which the arm assembly comprises a base plate that is centrally situated on the rear end of the trailer and three extension members that protrude from the base plate. Each extension member terminates in a torsion spring that in turn engages with another extension member, each of which terminates in a rotatable wheel. This invention is described in U.S. Pat. No. 7,246,838 (Searfoss, 2007), U.S. Pat. No. 7,726,720 (Searfoss, 2010), and U.S. Patent Application Pub. No. 20050057068 (Searfoss, 2005).

U.S. Pat. No. 6,513,856 (Swanson et al., 2003) involves a mechanism for rolling and unrolling a tarp over a trailer container. An electrically operated drive assembly is used to roll the roll bar back and forth between longitudinal edges of the container. The drive assembly comprises an electric motor and a gear reduction mechanism, both of which are supported on a telescoping tube assembly that is pivotably attached to the front of the container. A double reel member is fixedly attached to the forward end of the roll bar, and a single reel member is fixedly attached to the rearward end of the roll bar. Constant force spring members are fixedly attached to the double and single reel members and also to hinge plates mounted on the side of the container.

U.S. Pat. No. 7,513,561 (Royer, 2009) discloses a device for covering and uncovering the top of a container with a tarp, the device comprising a rod, a rod rotating component, and an actuator. The tarp is rolled around the rod when the cover is in a retracted position, and the rod rotating component is couple to the rod such that rotating the rod rotating component around its longitudinal axis also rotates the rod around its longitudinal axis. The rod rotating component is linked to an actuator that is operated manually and that causes the rod rotating component to rotate about its longitudinal axis. The length of the rod rotating component varies to allow the rod to remain linked to the actuator as the rod travels over the top of the container.

U.S. Pat. No. 7,188,887 (Schmeichel, 2007) describes a roll tarp system with a front bracket, front inner arm, front outer arm, rear bracket, rear inner arm, and rear outer arm. A flexible front bias member allows the front inner arm to pivot laterally with respect to the front outer arm and applies a force to retain the front inner arm and front outer arm in a concentrically aligned position. U.S. Pat. No. 7,195,304 (Schmeichel, 2007) includes a second bias member attached to the rear outer arm and rotatably connected to the rear end of the roller attached to the tarp.

Examples of tarp covering systems that involve front-to-back rather than side-to-side retraction and extension systems include: U.S. Pat. 7,111,891 (O'Brian et al., 2006); U.S. Pat. No. 6,893,071 (Chabot, 2005); U.S. Pat. No. 6,318,790 (Henning, 2001); U.S. Pat. No. 6,942,274 (Henning, 2005); and U.S. Pat. No. 6,575,519 (Henning, 2003). None of the above prior art references (involving side-to-side or front-to-back systems) provides a rear arm for a tarp cover system that is specifically designed to work with a three-piece tailgate.

BRIEF SUMMARY OF THE INVENTION

The present invention is a rear arm assembly for a tarp cover system comprising a main roller arm, the rear arm assembly comprising: a first arm that is secured to the main roller arm of the tarp cover system by a first connecting member; a second arm that is pivotally attached to the first arm; and a third arm that is connected to the second arm by a second connecting member that is curved at a roughly ninety-degree angle. In a preferred embodiment, the invention further comprises a two-piece bracket that is secured to the third arm and that surrounds a torsion spring axle.

In a preferred embodiment, the first arm comprises a plurality of apertures through which one or more bolts may be inserted to adjust the length of the first connecting member relative to the first arm. Preferably, the second arm comprises a plurality of apertures through which one or more bolts may be inserted to adjust the length of the second connecting member relative to the second arm. Preferably, the third arm comprises a plurality of apertures through which one or more bolts may be inserted to adjust the length of the second connecting member relative to the third arm.

In a preferred embodiment, the first connecting member is attached to the main roller arm of the tarp cover system by a top bracket. Preferably, the main roller arm passes through an aperture in the top bracket, a collar surrounds the main roller arm on either side of the top bracket, and the collars rotate with the main roller arm.

In a preferred embodiment, the invention further comprises a synthetic resinous fluorine-containing polymer bushing that is situated on the main roller arm between one of the collars and the top bracket. Preferably, the top bracket comprises a vertical portion that extends downward from the main roller arm and terminates in an angled portion that extends outward from the vertical portion at a roughly forty-five degrees, the vertical portion has a vertical axis, the angled portion of the vertical portion terminates in a horizontal portion that extends back toward the vertical axis of the vertical portion at a roughly forty-five-degree angle relative to the angled portion, the first connecting member has a top, and the top of first connecting member is situated directly underneath the bushing.

In a preferred embodiment, the invention further comprises one or more torsion springs situated on the torsion spring axle. Preferably, the third arm has a top, the two-piece bracket comprises two support pieces, each having a top portion and a bottom portion, the bottom portion of each support piece is welded to the top of the third arm, and the torsion spring axle extends through the top portion of each of the two support pieces. Preferably, a torsion spring catch rod extends between the two support pieces that comprise the two-piece bracket, and each torsion spring comprises a first end that is inserted into a slot in the torsion spring axle and a second end that wraps around the torsion spring catch rod.

In a preferred embodiment, the torsion spring axle comprises a circumferential channel into which an external retaining ring is inserted, one of the two support pieces comprising the two-piece bracket comprises an outer face, and the external retaining ring is situated on the outer face of the support piece. Preferably, the invention further comprises a collar that surrounds the torsion spring axle and is situated between one of the two support pieces that comprises the two-piece bracket and a mounting bracket that mounts the rear arm assembly to the tailgate.

In a preferred embodiment, the invention further comprises a mounting bracket comprising a first support member and a second support member, each of which comprises a first plate at a ninety-degree angle to a second plate, the first and second plates of the first supporting member comprise one or more slots through which bolts are inserted to secure the first support member to a tailgate and to the second support member, the torsion spring axle extends outwardly from the first plate of the second support member, and the second plate of the second support member comprises one or more slots through which bolts are inserted to secure the second support member to the first support member. Preferably, the first connecting member is attached to the main roller arm of the tarp cover system by a top bracket, the top bracket pivots on the main roller arm, the first arm pivots relative to second arm at a pivot point, and the two-piece bracket pivots on the torsion spring axle.

In an alternate embodiment, the present invention is a rear arm assembly for a tarp cover system comprising a main roller arm, the rear arm assembly comprising: a first arm that is secured to the main roller arm of the tarp cover system; and a second arm with two ends, wherein one end of the second arm is pivotally attached to the first arm, wherein the other end of the second arm is attached to a bracket that holds a torsion spring axle, wherein the second arm comprises a roughly ninety-degree bend, wherein one or more torsion springs are situated on the torsion spring axle, and wherein the torsion spring axle is connected to a mounting bracket that is secured to a three-piece tailgate. The rear arm assembly is not attached to the tailgate at any point other than at the mounting bracket.

REFERENCE NUMBERS

Figure 1:
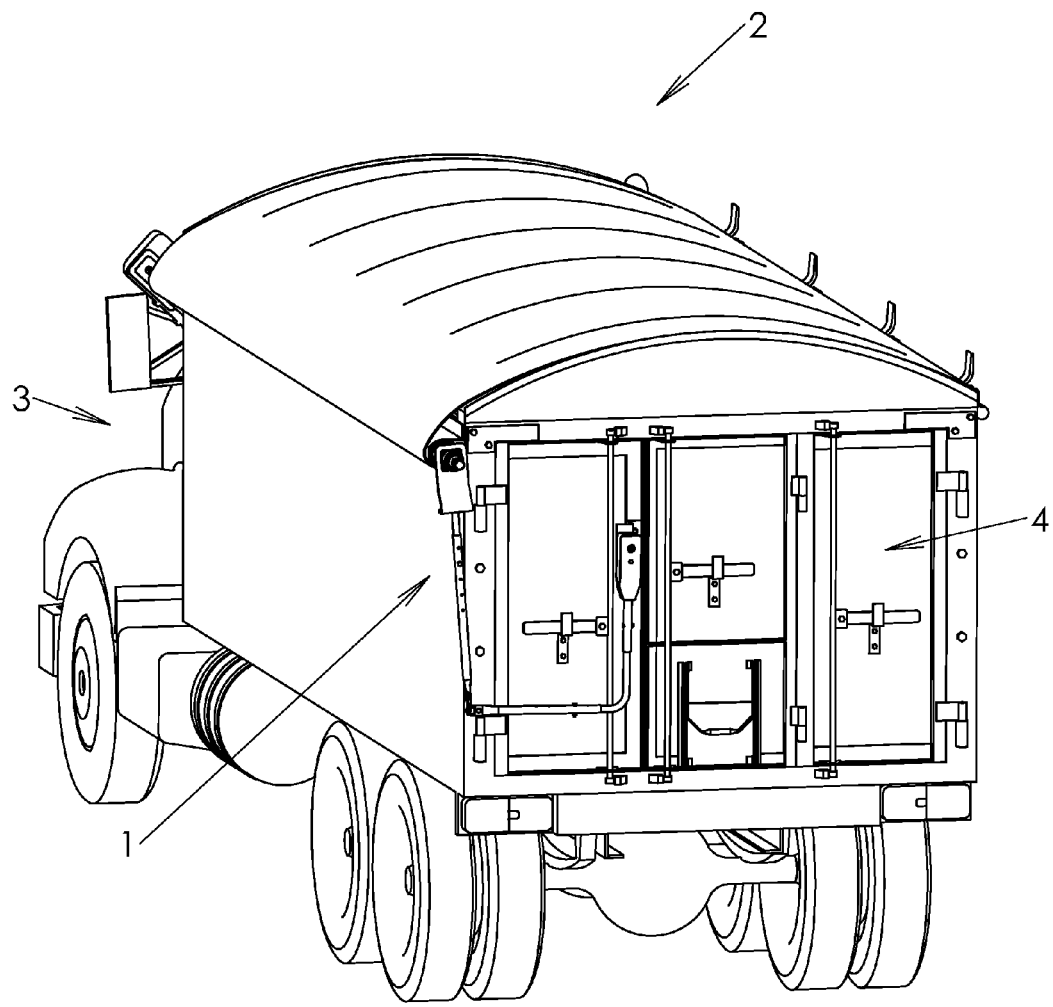
FIG. 1 is a perspective view of the present invention installed on a farm truck with a three-piece tailgate shown with the tailgate closed and the tarp cover fully closed.

1 Rear arm assembly (present invention)
2 Tarp cover system
2a Rail (of tarp cover system)
3 Farm truck 4 Three-piece tailgate
4a Left door (of three-piece tailgate)
4b Center door (of three-piece tailgate)
4c Right door (of three-piece tailgate)
4d Bottom chute (of center door)
5 First arm (of present invention)
6 Main roller arm (of tarp cover system)
7 First connecting member
7a Flanged bolt
8 Second arm (of present invention)
9 Third arm (of present invention)
10 Second (arcuate) connecting member
11 Two-piece bracket
12 Axle (of torsion springs)
12a Slot (in torsion spring axle)
12b Circumferential channel (in torsion spring axle)
13 Top bracket
13a Vertical portion (of top bracket)
13b Angled portion (of top bracket)
13c Horizontal portion (of top bracket)
14 Collar
15 TEFLON® plate/bushing
16 Torsion spring
16a First end (of torsion spring)
16b Second end (of torsion spring)
17 Collar
18 Torsion spring catch rod
19 Mounting bracket
19a First support member (of mounting bracket)
19b Second support member (of mounting bracket)
19c Slot (in support member of mounting bracket)
20 Pivot point (in rear arm assembly)
21 Washer
22 Nut
23 Chain link
24 Bolt

DETAILED DESCRIPTION OF INVENTION

FIG. 1 is a perspective view of the present invention installed on a farm truck with a three-piece tailgate shown with the tailgate closed and the tarp cover fully closed. As shown in this figure, the present invention—a rear arm assembly 1—can be retrofit to an existing tarp cover system 2, and or it can be sold as part of a new tarp cover system 2. The tarp cover system 2 is a side-to-side tarp cover system that is used in connection with a farm truck 3, dump truck, or similar vehicle. The rear arm assembly 1 is specifically designed to work with a three-piece tailgate 4.

Figure 2:
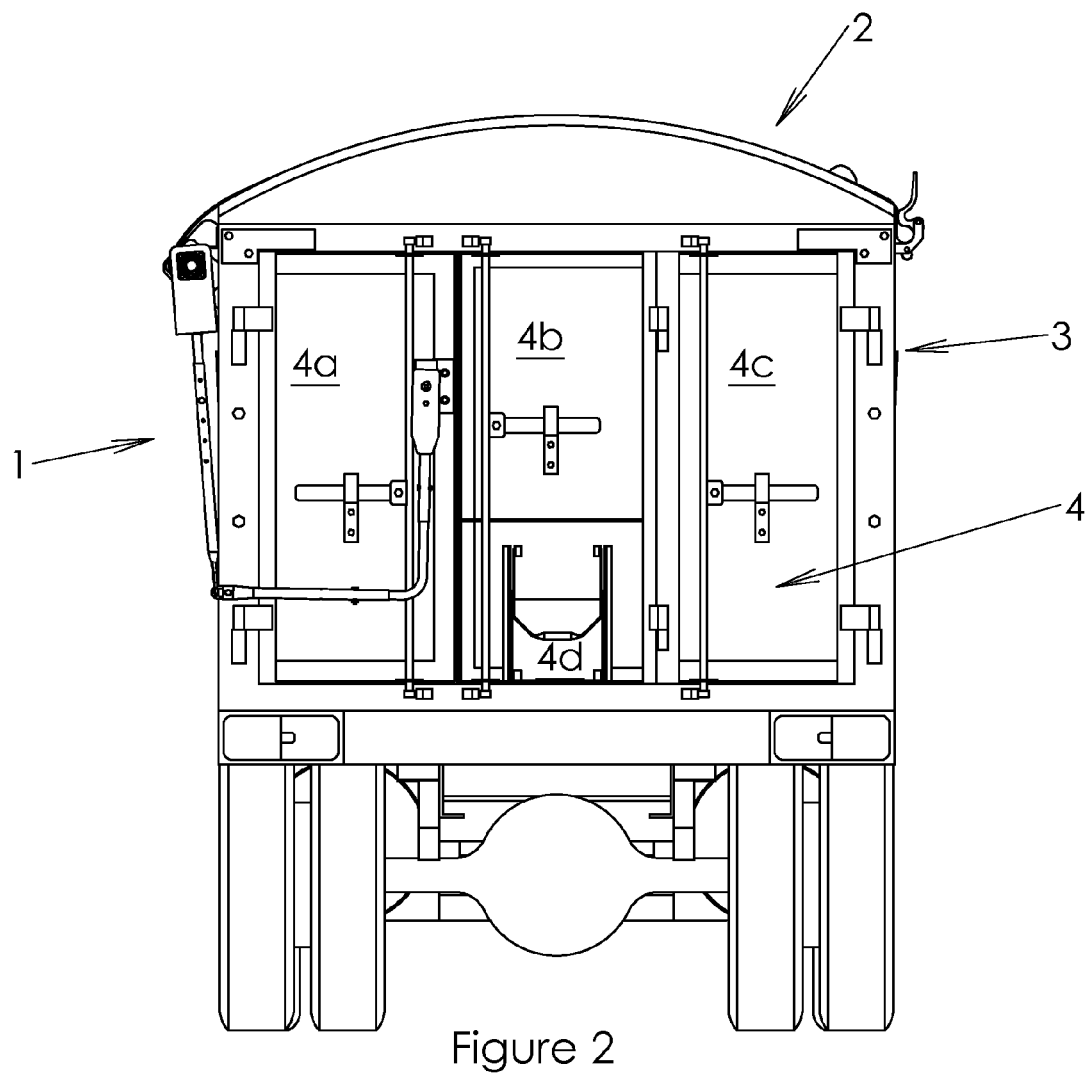
FIG. 2 is a rear view of the present invention shown with the tailgate and tarp cover in the position shown in FIG. 1.

FIG. 2 is a rear view of the present invention shown with the tailgate and tarp cover in the position shown in FIG. 1. As shown in this figure, the three-piece tailgate comprises a left door 4a, a center door 4b, and a right door 4c. in a typical three-piece tailgate for a farm truck, the center door 4b comprises a bottom chute 4d that can be opened to allow grain, seeds or other crops to exit the truck, body when it is inclined. The purpose of the present invention is to provide a rear arm assembly for a tarp cover system that allows the three-piece tailgate to remain functional.

Figure 3:
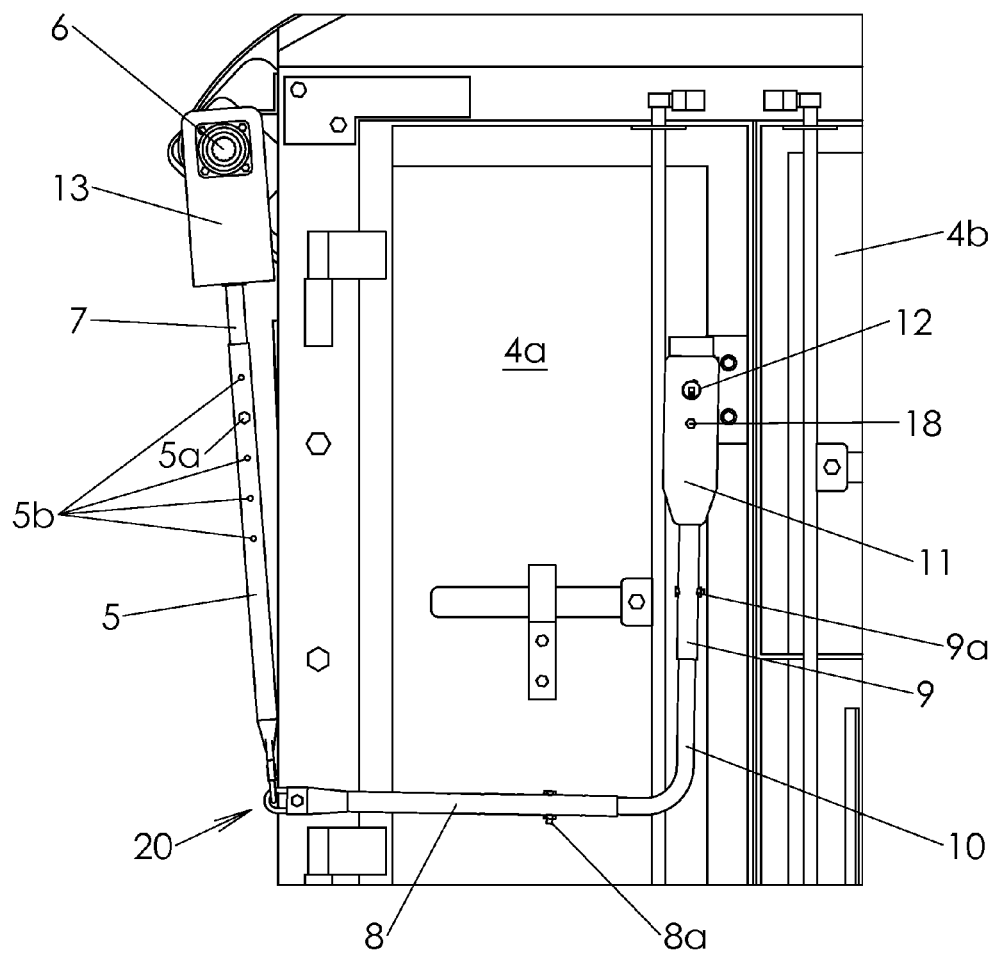
FIG. 3 is a detail view of the present invention shown with the tailgate and tarp cover in the position shown in FIG. 1.

FIG. 3 is a detail view of the present invention shown with the tailgate and tarp cover in the position shown in FIG. 1. As shown in this figure, the present invention comprises a first arm 5 that is secured to the main roller arm 6 of the tarp cover system via a first connecting member 7 (see FIG. 19 for a detail view of how the first arm 5 is secured to the main roller arm 6). (In an alternate embodiment, the first arm 5 is secured directly to the main roller arm 6 without a first connecting member 7. In this embodiment, the first arm 5 and first connecting member 7 would not telescope in relation to one another, as described below.) The first arm 5 is pivotally attached to a second arm 8 (see FIG. 20 for a detail view of one method of pivotally attaching the first arm 5 to the second arm 8). The second arm 8 is connected to a third arm 9 via a second (arcuate) connecting member 10. (In an alternate embodiment, the second and third arms 8, 9 are a single part with a ninety-degree bend in it. In this embodiment, the second and third arms 8, 9 would not telescope in relation to the second (arcuate) connecting member 10, as described below.) The third arm 9 is welded to a two-piece bracket 11 that surrounds the torsion spring axle 12. The location and purpose of the torsion springs is discussed below in connection with FIGS. 5, 10, 15, 17 and 18.

In a preferred embodiment, the first arm 5 comprises a plurality of apertures 5b through which a bolt 5a extends to connect the first arm 5 to the first connecting member 7. The total length of the first arm 5 and first connecting member 7 can be adjusted by removing the bolt 5a, moving the first arm 5 up or down in relation to the first connecting member 7, and reinserting the bolt 5a though the first arm 5 and first connecting member 7. Similarly, the second and third arms 8, 9 optionally comprise a plurality of apertures (not shown) through which bolts 8a (for the second arm 8) and 9a (for the third arm 9) extend to connect the second arm 8 and third arm 9, respectively, to the second (arcuate) connecting member 10. The position of the second and third arms 8, 9 relative to the second (arcuate) connecting member 10 can be adjusted by removing the bolts 8a, 9a, moving the second and third arms 8, 9 relative to the second (arcuate) connecting member 10, and reinserting the bolt 8a through the second arm 8 and second (arcuate) connecting member 10 and the bolt 9a through the third arm 9 and second (arcuate) connecting member 10. In this manner, all three arms 5, 8 and 9 telescope relative to the connecting members 7, 10. This structural feature allows the present invention to be adjusted to accommodate tailgates of different heights and widths.

Figure 4:
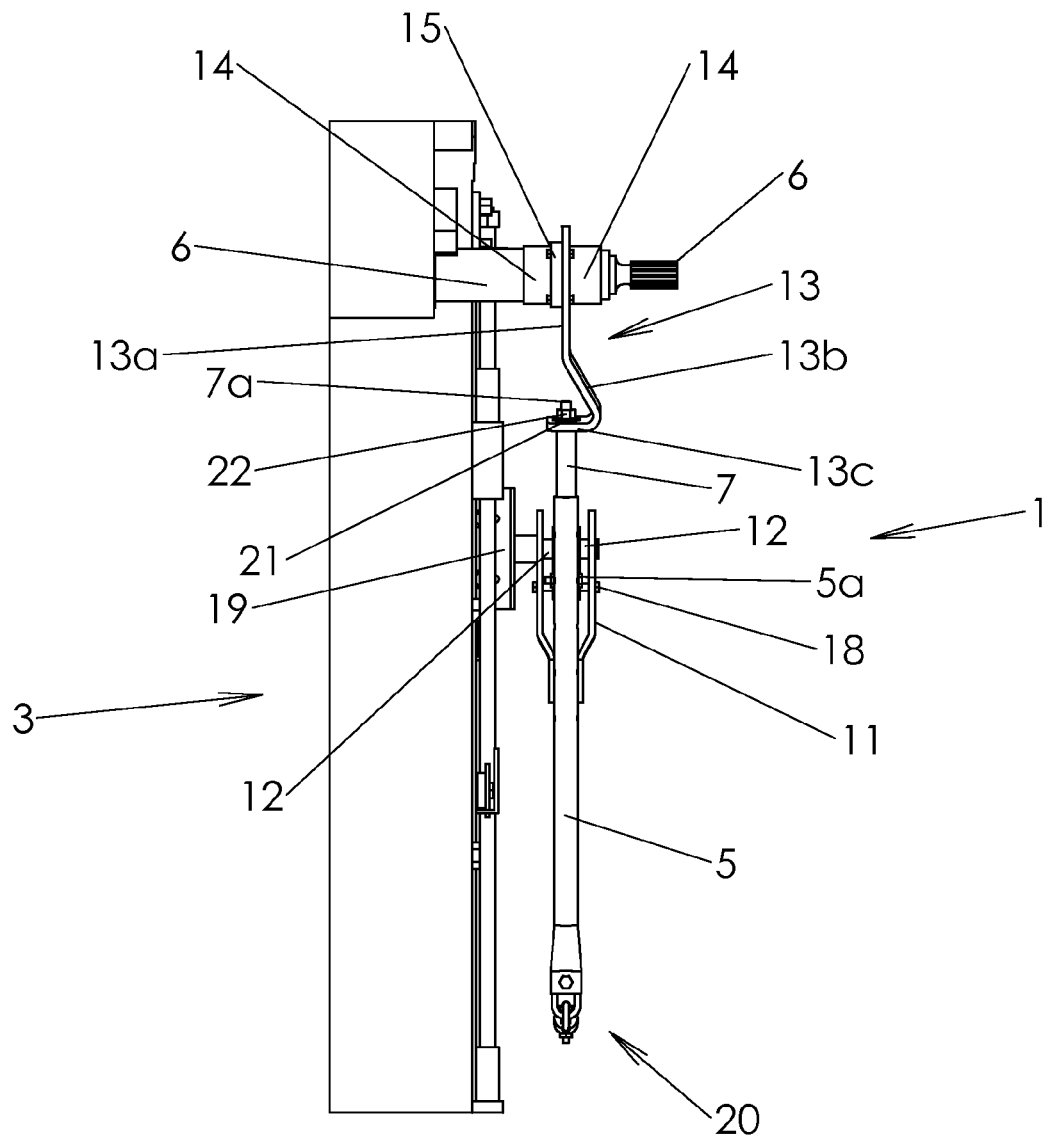
FIG. 4 is a left side view of the present invention shown with the tailgate and tarp cover in the position shown in FIG. 1.

FIG. 4 is a left side view of the present invention shown with the tailgate and tarp cover in the position shown in FIG. 1. This figure shows the top bracket 13 that attaches the first connecting member 7 to the main roller arm 6. In a preferred embodiment, the main roller arm 6 passes through an aperture (not shown) in the top bracket 13. A collar 14 surrounds the main roller arm 6 on either side of the top bracket 13; the purpose of the collars 14 is to hold the top bracket 13 in position on the main roller arm 6. These collars 14 rotate with the main roller arm 6 when the tarp is opened and closed. A TEFLON® (synthetic resinous fluorine-containing polymer) plate or bushing 15 is preferably situated between the top bracket 13 and one of the collars 14 to alleviate friction between the collar 14 and the top bracket 13 when the collars 14 rotate.

Note that the top bracket 13 preferably comprises a vertical portion 13a that extends downward from the main roller arm and terminates in an angled portion 13b that extends outward from the vertical portion 13a at roughly forty-five degrees (45°). The angled portion 13b terminates in a horizontal portion 13c that extends back toward the vertical axis of the vertical portion 13a at a roughly forty-five-degree (45°) angle relative to the angled portion 13b. Thus, the overall shape of the top bracket 13 resembles a nose. A flanged bolt 7a is preferably welded to the top of the first connecting member 7 and extends through an aperture (not shown) in the horizontal portion 13c of the top bracket 13. A washer 21 and nut 22 are situated on the flanged bolt 7a on top of the horizontal portion 13c of the top bracket 13. With this configuration, the top of the first connecting member 7 (i.e., the flanged bolt 7a) is situated directly underneath the TEFLON® plate 15. This design feature ensures that the rear arm assembly 1 will function evenly (relative to the tailgate 4) and not pull in one lateral direction (i.e., toward or away from the tailgate 4) or another.

Figure 5:
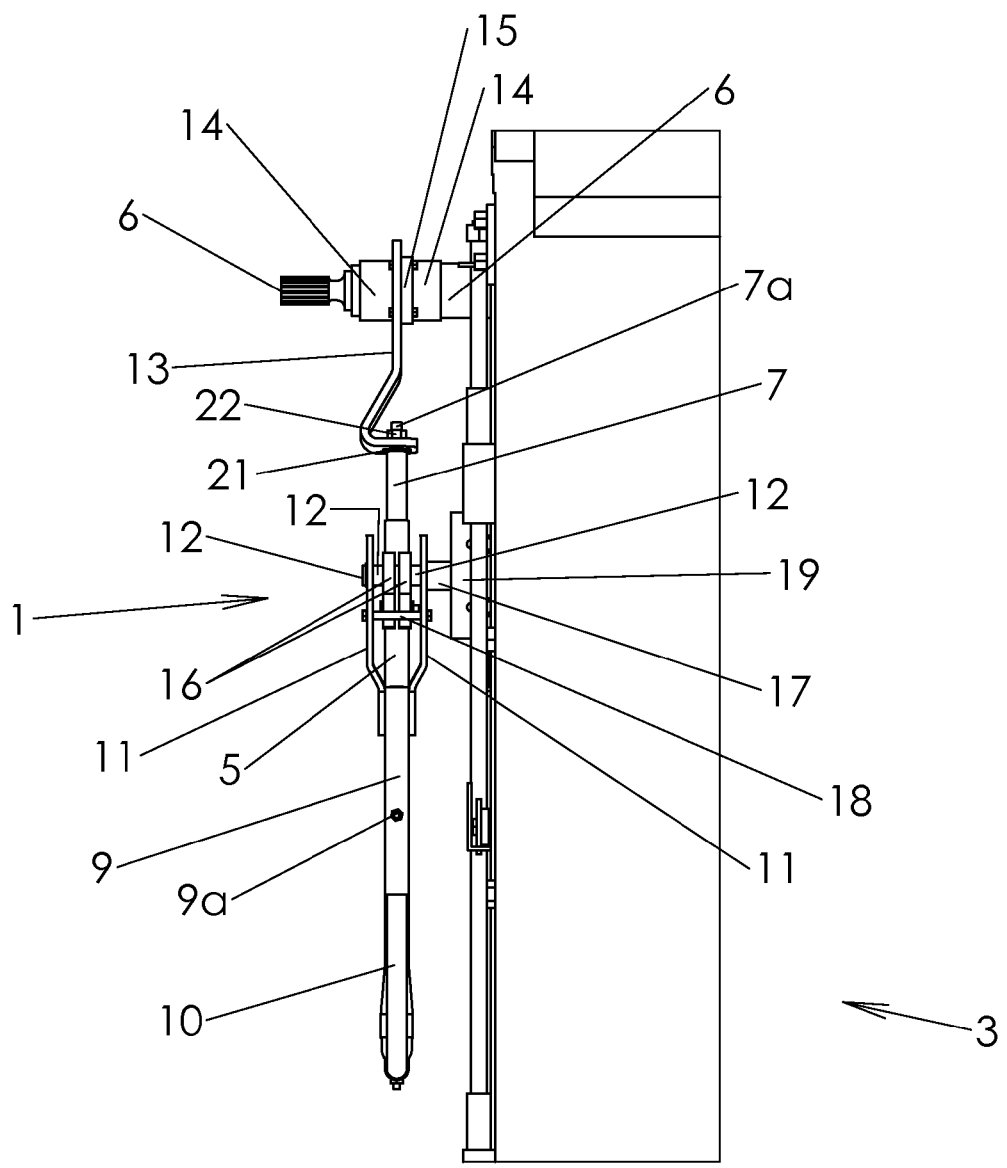
FIG. 5 is a right side view of the present invention shown with the tailgate and tarp cover in the position shown in FIG. 1.

FIG. 5 is a right side view of the present invention shown with the tailgate and tarp cover in the position shown in FIG. 1. This figure shows the torsion springs 16, which are situated on the torsion spring axle 12 (see also FIGS. 17 and 18). Although this figure shows two torsion springs 16, the present invention is not limited to any particular number of torsion springs. FIG. 5 also shows the two-piece bracket 11 that lies on either side of the torsion springs 16. The two-piece bracket 11 comprises two identically shaped support pieces, the bottom portions of which are welded to the top of the third arm 9. The torsion spring axle 12 extends through the top portion of each of the two support pieces. A torsion spring catch rod 18 extends between the two support pieces that comprise the two-piece bracket 11, roughly in the center of each support piece. The purpose of the torsion spring catch rod 18 is shown more clearly in FIGS. 17-19.

A collar 17 surrounds the torsion spring axle 12 and is situated between the inner-most support piece of the two-piece bracket 11 and the mounting bracket 19, which mounts the rear arm assembly 1 to the tailgate 4. The torsion spring axle 12 is preferably welded to the mounting bracket 19. The mounting bracket 19 (shown in greater detail in FIG. 21) is the only point at which the rear arm assembly 1 is attached to the tailgate 4. The only other attachment point is at the top bracket 13, where the rear arm assembly 1 is connected to the main roller arm 6.

Figure 6:
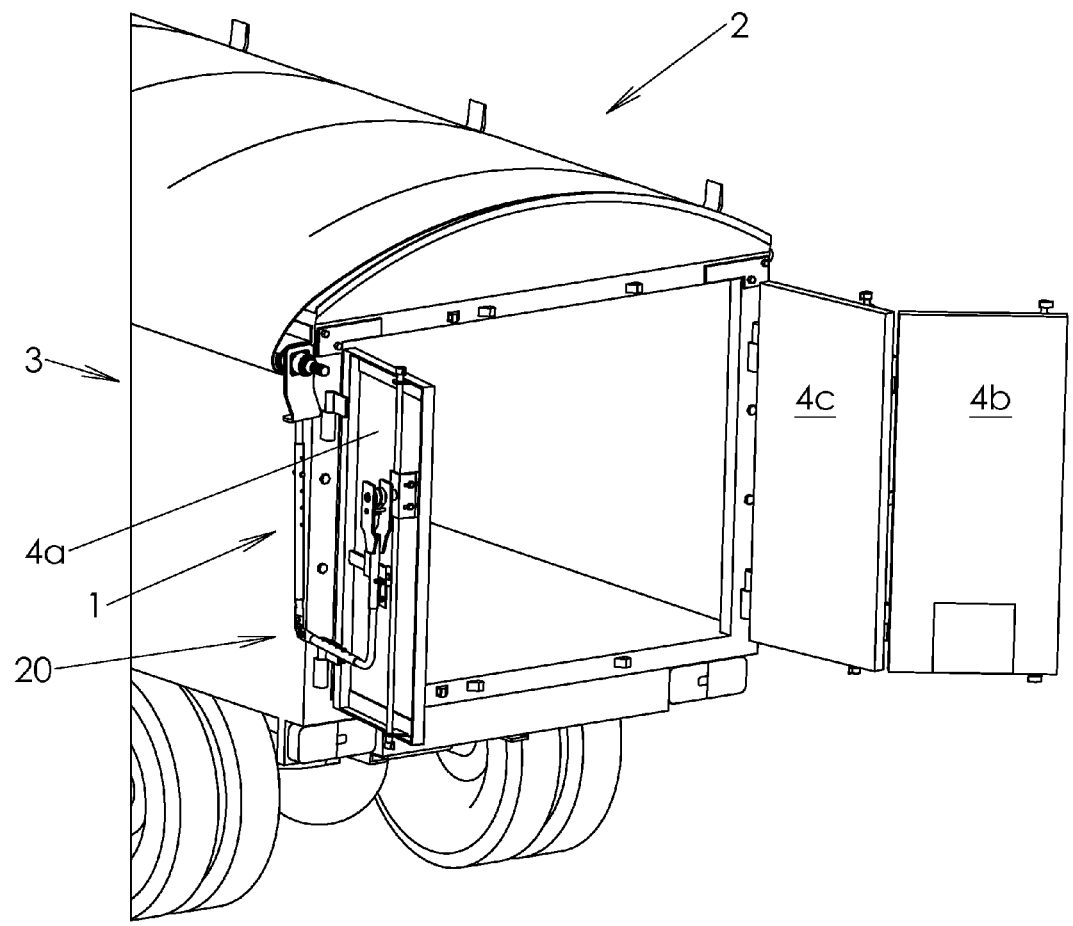
FIG. 6 is a perspective view of the present invention shown with the tailgate completely open and the tarp cover fully closed.

FIG. 6 is a perspective view of the present invention shown with the tailgate completely open and the tarp cover fully closed. As shown in this figure, because of the pivot point 20 between the first and second arms 5, 8, and also because no part of the rear arm assembly 1 is attached to the center or right doors 4b, 4c of the three-piece tailgate 4, the tailgate can be completely opened when the tarp cover is fully closed, as shown.

Figure 7:
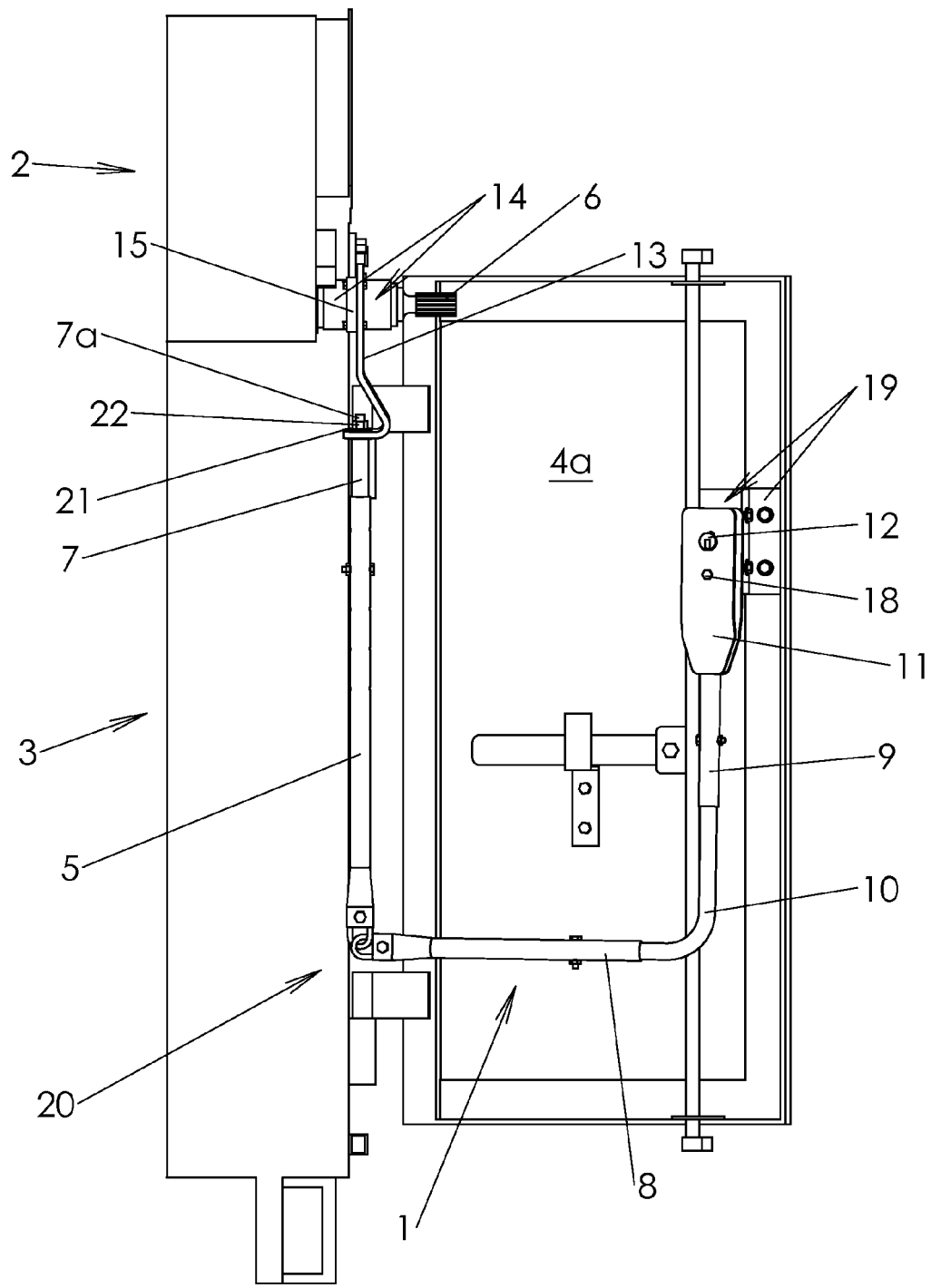
FIG. 7 is a left side view of the present invention shown with the left door of the tailgate open and the tarp cover fully closed.

FIG. 7 is a left side view of the present invention shown with the left door of the tailgate open and the tarp cover fully closed. As shown in this and the previous figure, the tailgate is fully functional when the tarp cover is closed.

Figure 8:
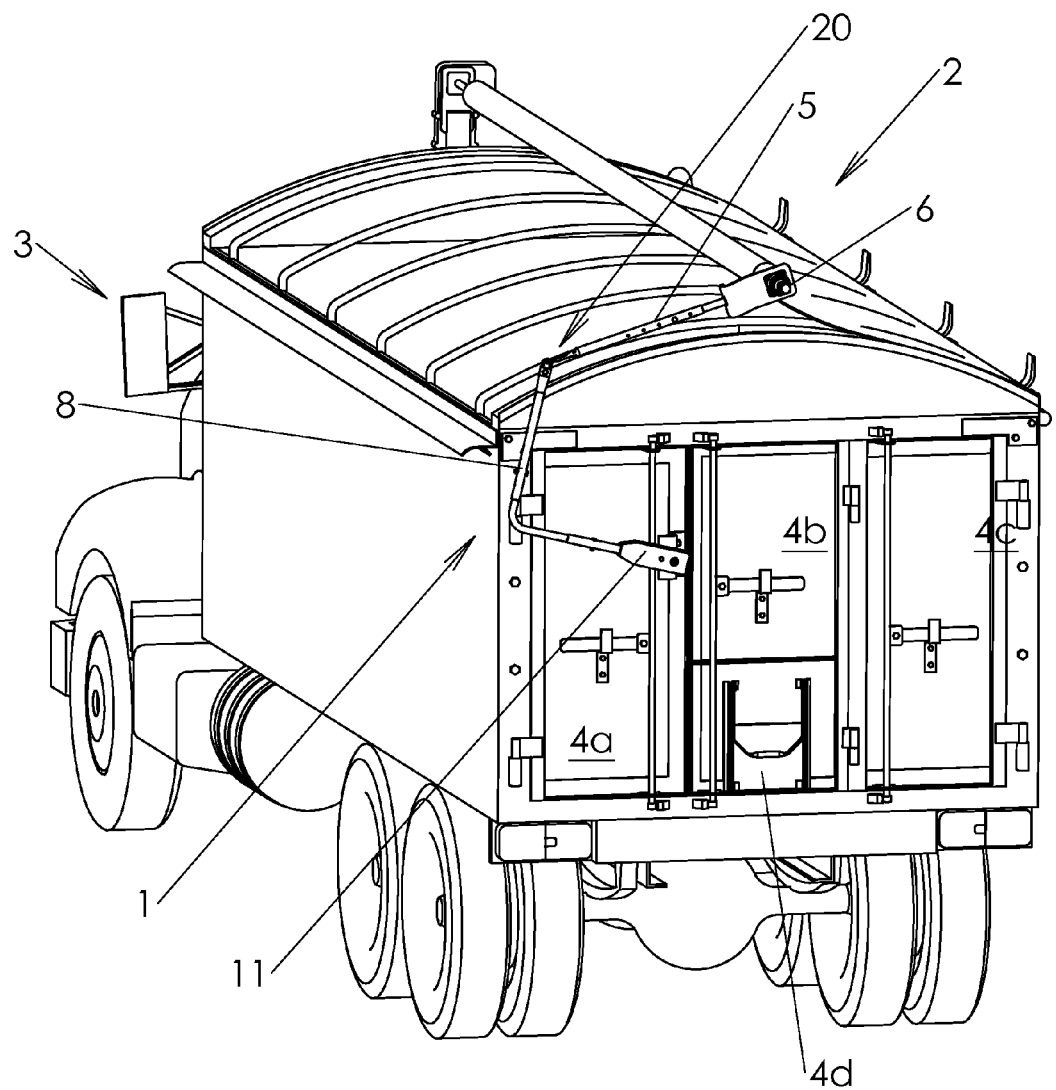
FIG. 8 is a perspective view of the present invention shown with the tailgate closed and the tarp cover partially open.

FIG. 8 is a perspective view of the present invention shown with the tailgate closed and the tarp cover partially open. As shown in this figure, as the main roller arm 6 (which is controlled by a motor (not shown)) travels up and over the top of the tarp cover system 2, the rear arm assembly 1 pivots at three places. First, the top bracket 13 pivots on the main roller arm 6 (see FIG. 4). Preferably, the TEFLON® plate 15 is bolted to the top bracket 13 so that it rotates with the top bracket 13, and the collars 14 are bolted to the main roller arm 6 so that they rotate with the main roller arm 6. Second, the first arm 5 pivots relative to the second arm 8 at the pivot point 20. Third, the two-piece bracket 11 pivots on the torsion spring axle 12 (see FIG. 5). Because of these three pivot points, the rear arm assembly 1 is able to stretch out and over the top of the tarp cover system 2 with the main roller arm 6.

Figure 9:
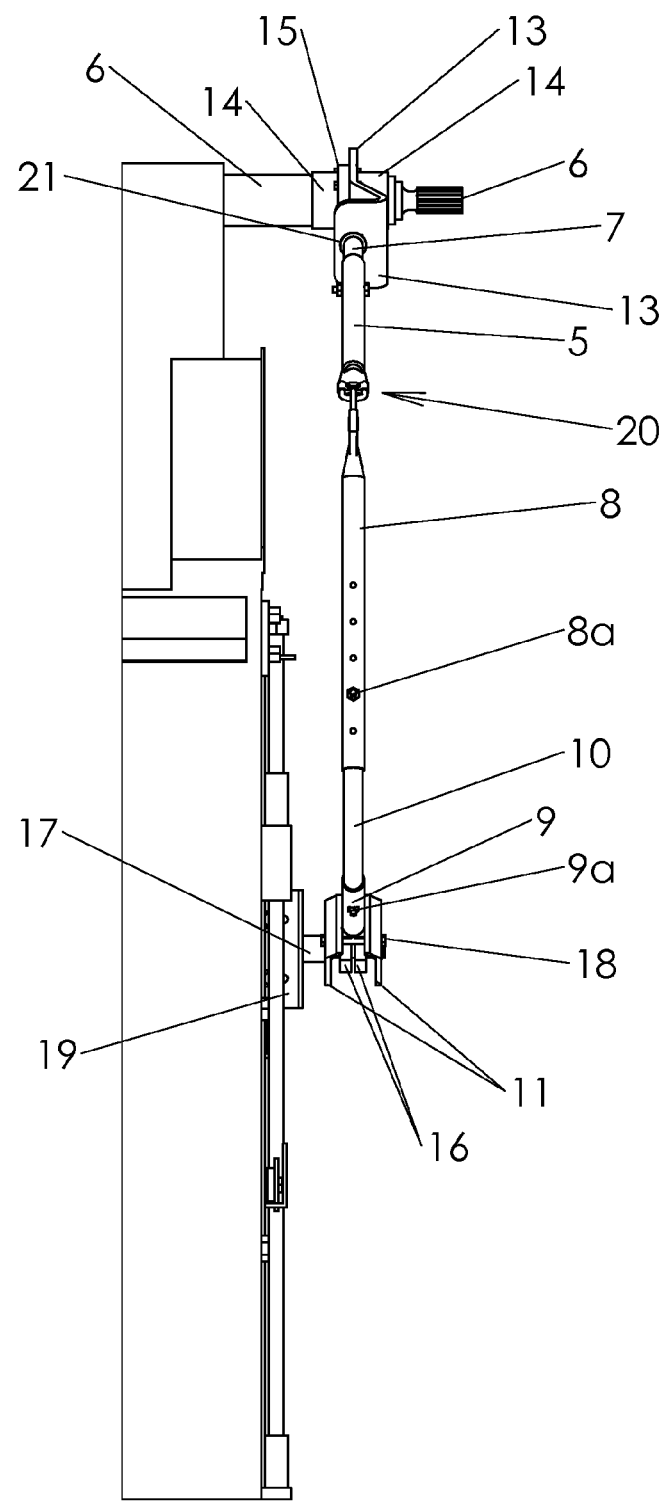
FIG. 9 is a left side view of the present invention shown with the tailgate and tarp cover in the position shown in FIG. 8.
Figure 10:
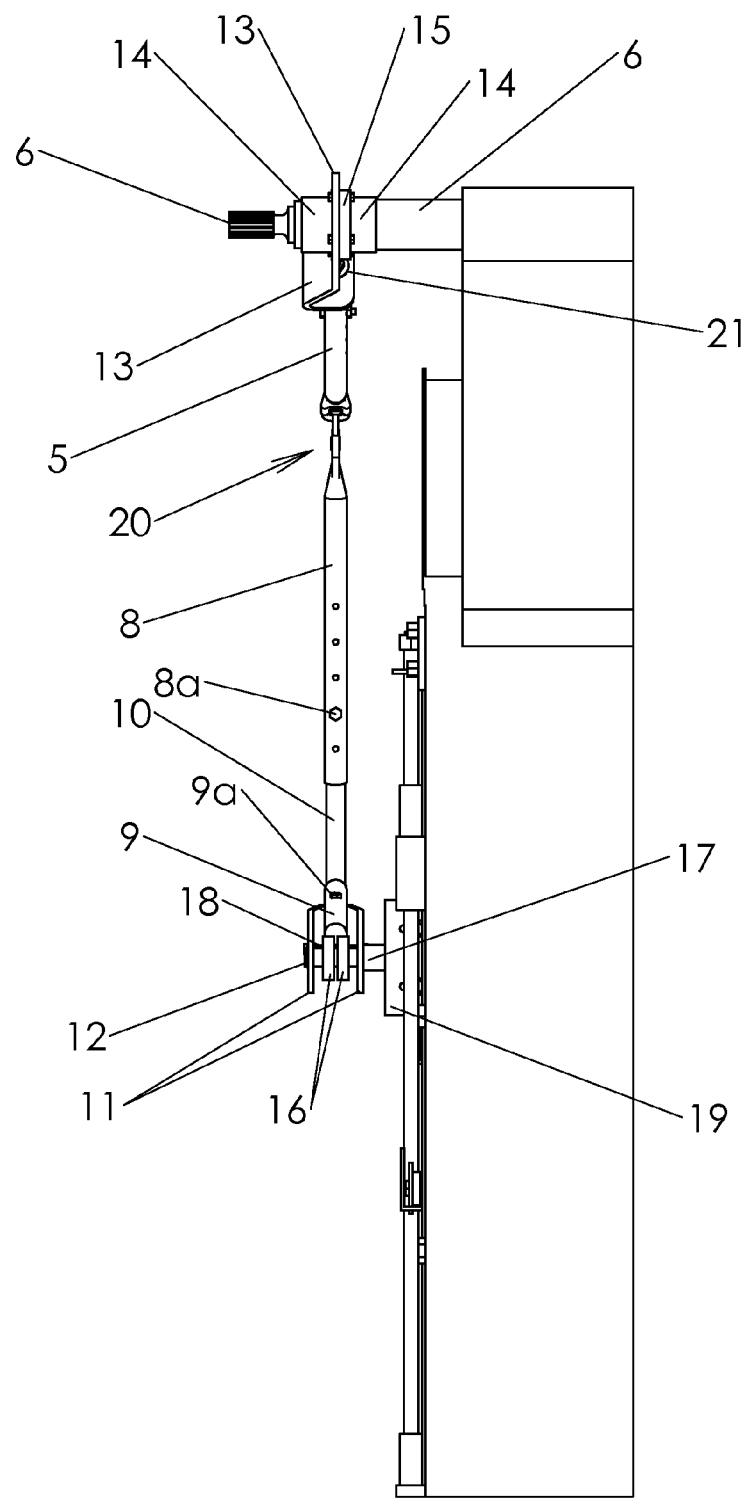
FIG. 10 is a right side view of the present invention shown with the tailgate and tarp cover in the position shown in FIG. 8.

FIG. 9 is a left side view of the present invention shown with the tailgate and tarp cover in the position shown in FIG. 8. FIG. 10 is a right side view of the present invention shown with the tailgate and tarp cover in the position shown in FIG. 8.

Figure 11:
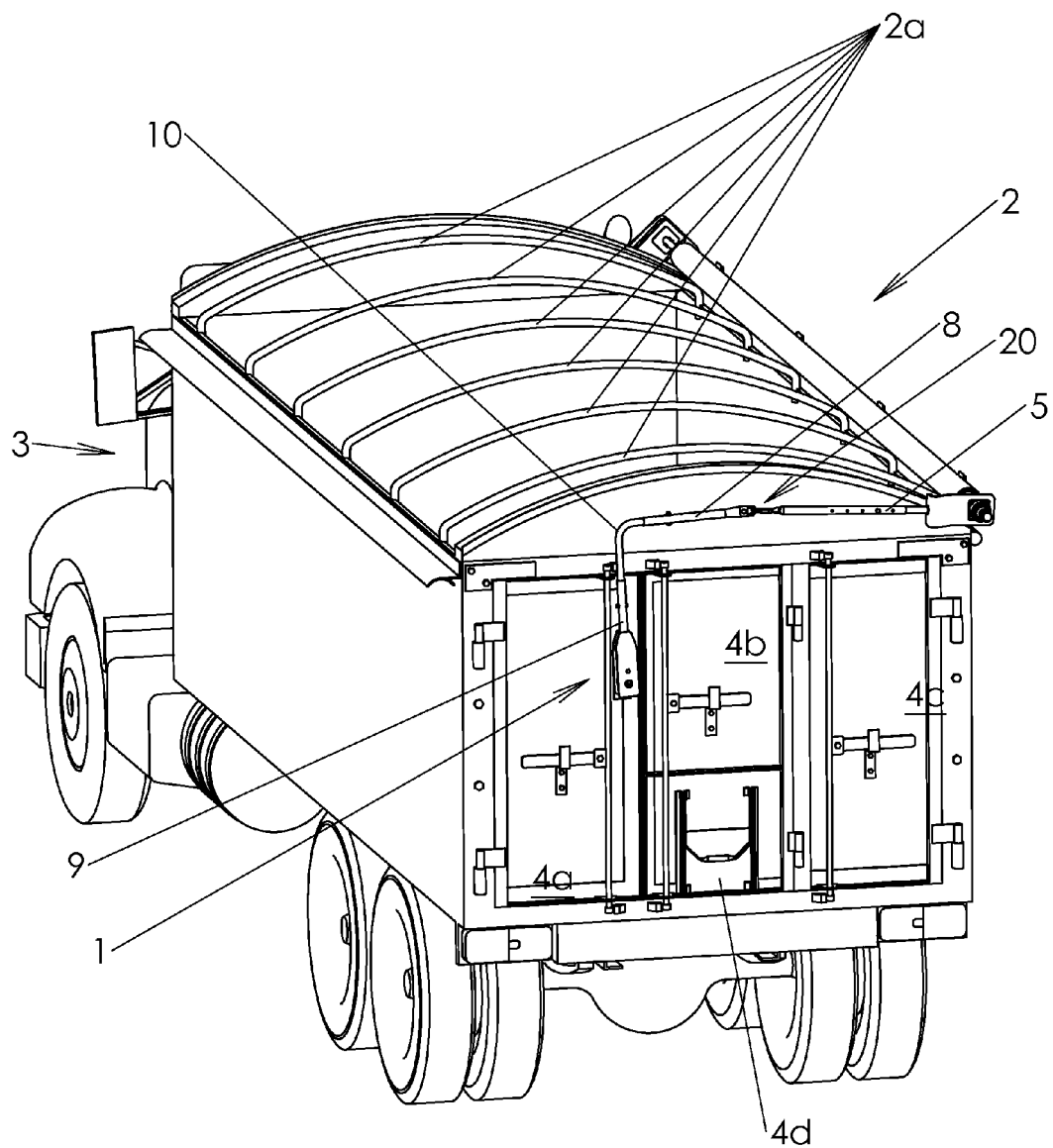
FIG. 11 is a perspective view of the present invention shown with the tailgate closed and the tarp cover completely open.

FIG. 11 is a perspective view of the present invention shown with the tailgate closed and the tarp cover completely open. As shown in this figure, when the tarp cover is fully open, the pivot point 20 between the first and second arms 5, 8 allows the arms to align with each other laterally to form a near horizontal line. The second (arcuate) connecting member 10 is curved at roughly a ninety-degree (90°) angle to allow the first and second arms 5, 8 to extend fully at a roughly ninety-degree (90°) angle from the third arm 9, as shown. (Without this 90-degree angle, the invention would not work because the second connecting member 10 has to curve around the top left corner of the left door 4a of the tailgate when the rear arm assembly is fully extended.) This figure also illustrates that the center 4b and right 4c doors of the three-piece tailgate 4 are still functional even with the tarp cover in a completely open position (see also FIG. 16).

The function of the torsion springs 16 (see FIGS. 5, 10, 14, 15, 17, 18 and 19) is to maintain sufficient pressure on the main roller arm 6 to prevent the tarp cover from blowing off on a windy day and also to assist the main roller arm 6 in traveling back up and over the rails 2a and/or load (the load could extend above the rails 2a) to close the tarp cover. In the position shown in FIG. 11, the torsion springs are at maximum tension relative to the torsion spring catch rod 18 (see FIG. 18).

Figure 12:
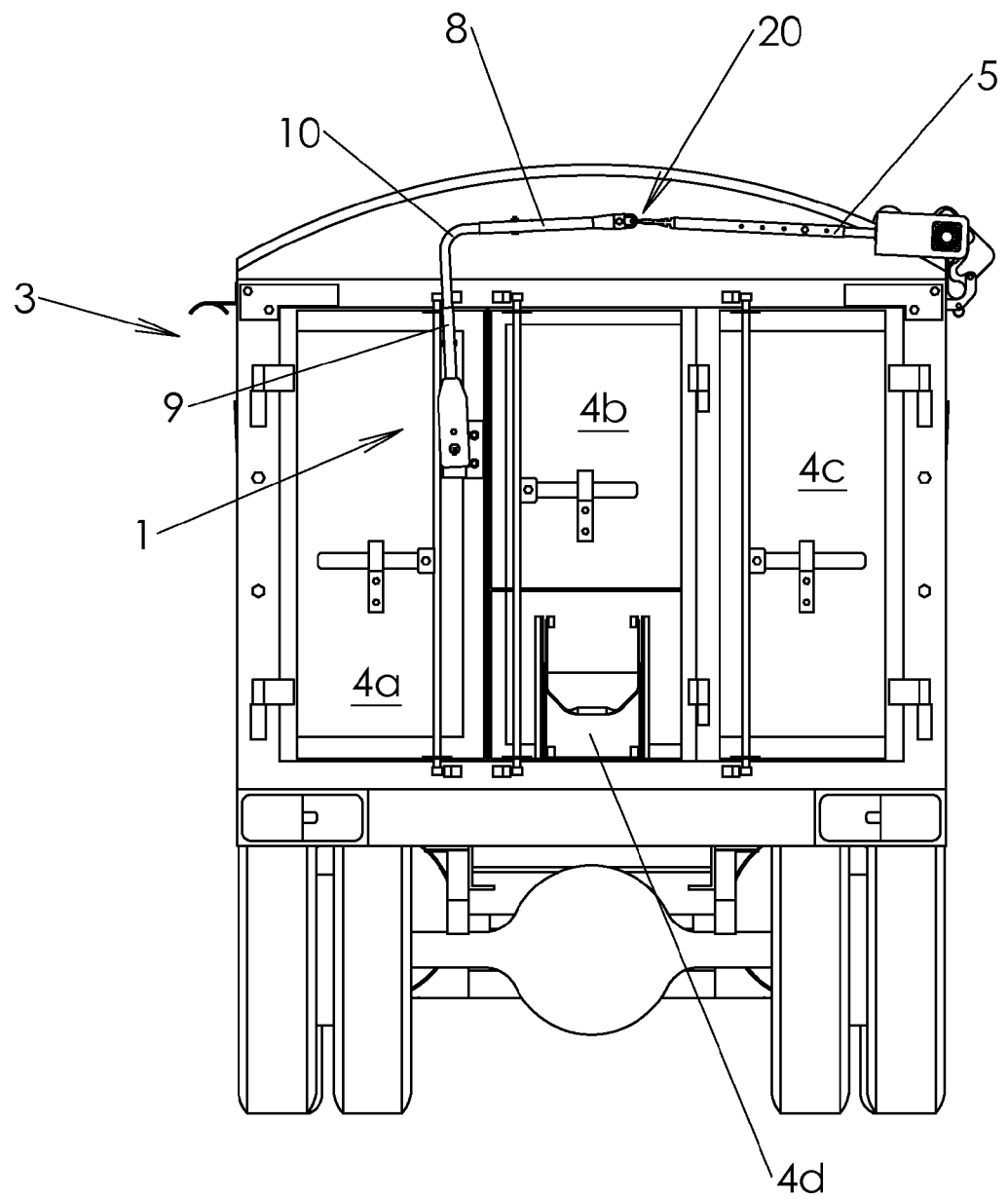
FIG. 12 is a rear view of the present invention shown with the tailgate and tarp cover in the position shown in FIG. 11.
Figure 13:
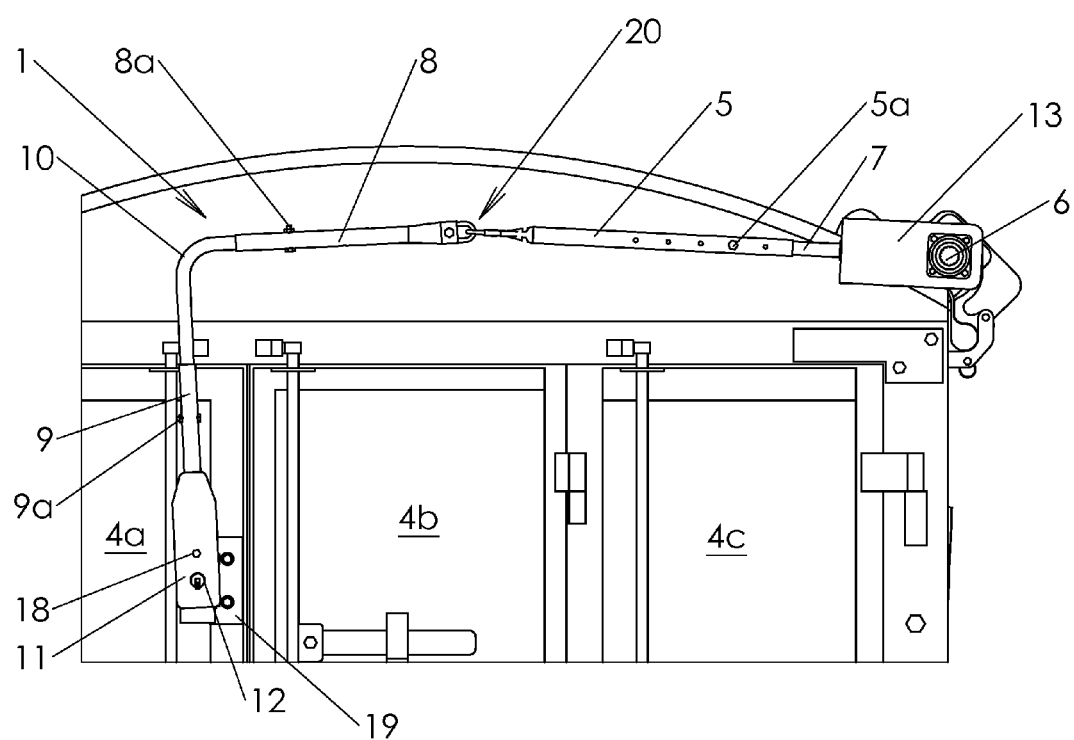
FIG. 13 is a detail view of the present invention shown with the tailgate and tarp cover in the position shown in FIG. 11.

FIG. 12 is a rear view of the present invention shown with the tailgate and tarp cover in the position shown in FIG. 11. FIG. 13 is a detail view of the present invention shown with the tailgate and tarp cover in the position shown in FIG. 11.

Figure 14:
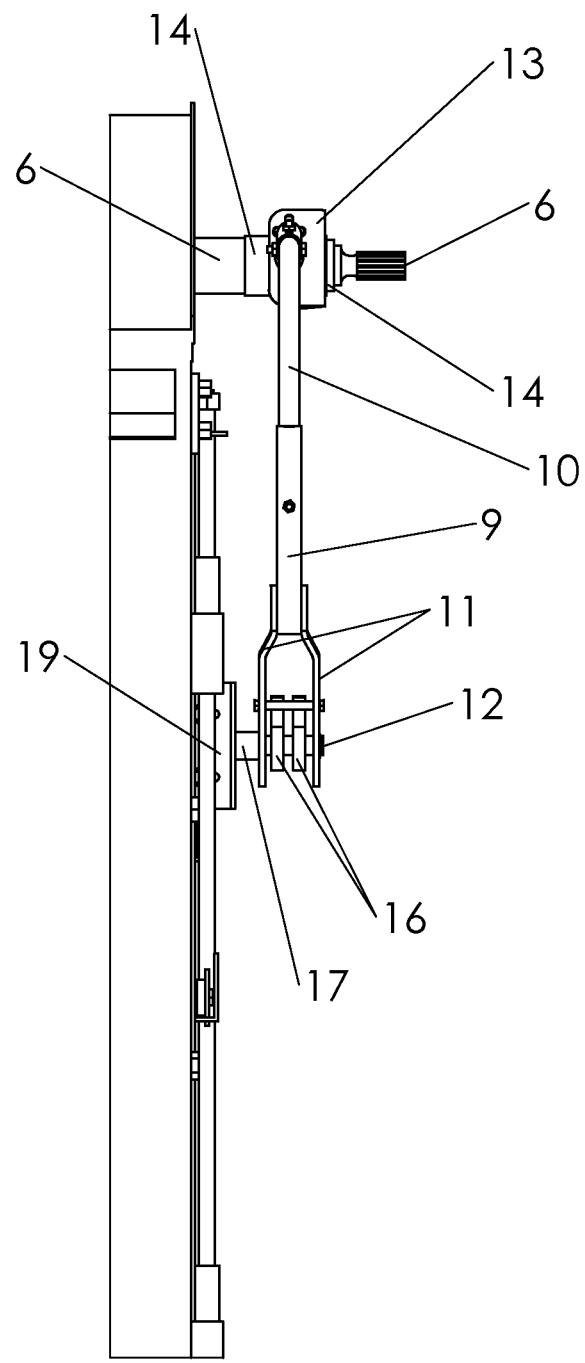
FIG. 14 is a left side view of the present invention shown with the tailgate and tarp cover in the position shown in FIG. 11.
Figure 15:
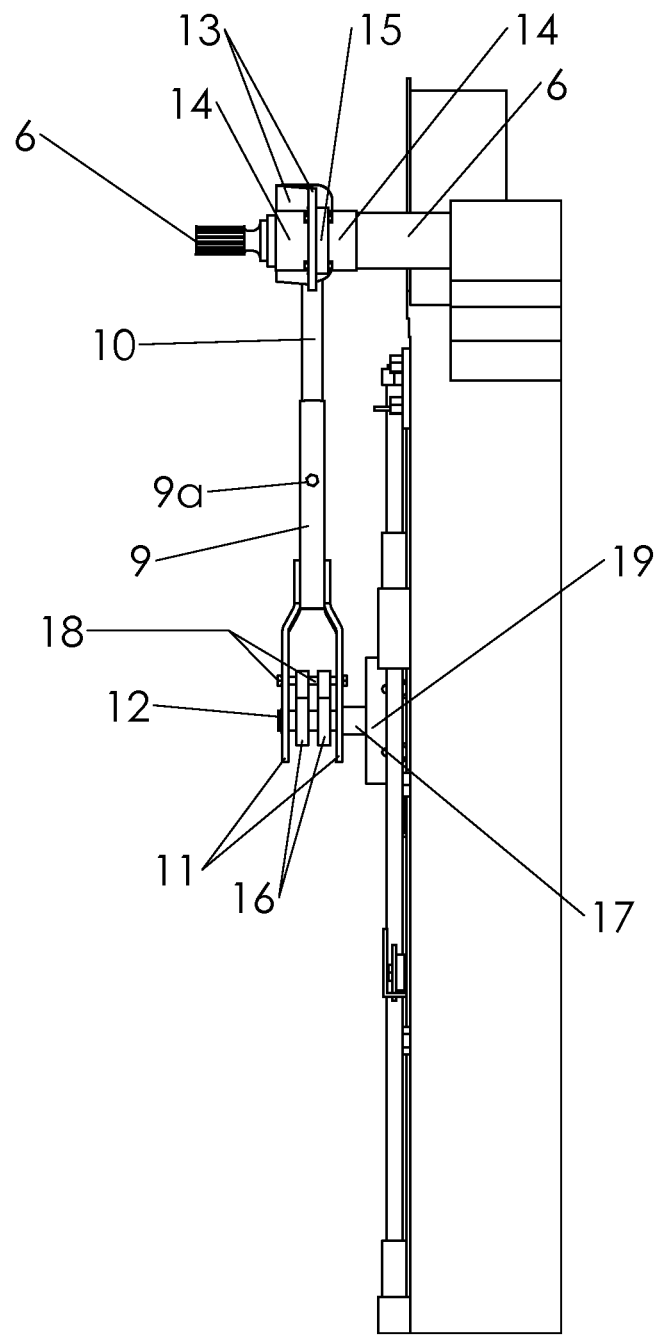
FIG. 15 is a right side view of the present invention shown with the tailgate and tarp cover in the position shown in FIG. 11.
Figure 16:
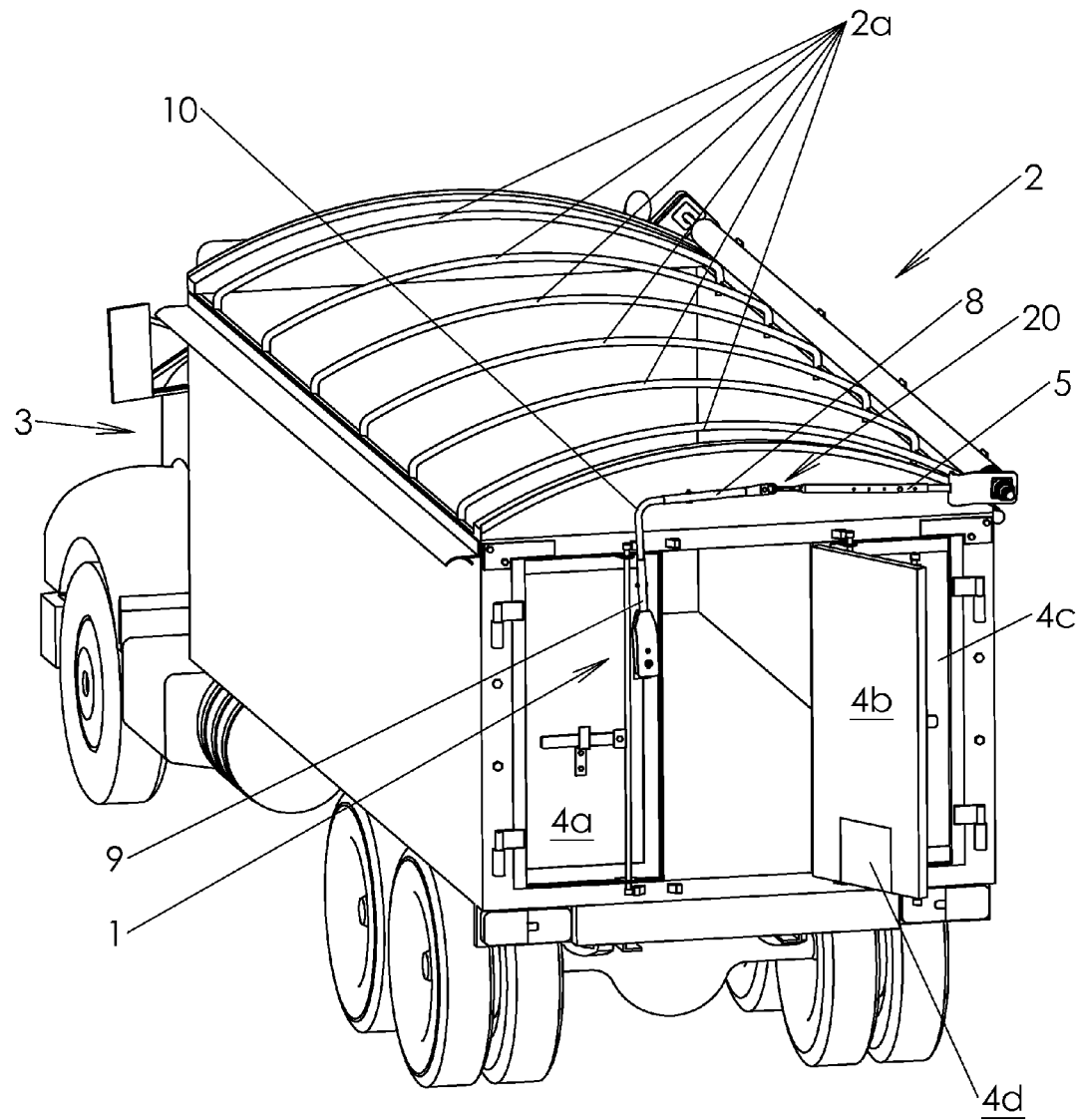
FIG. 16 is a perspective view of the present invention shown with the tailgate partially open and the tarp cover fully open.

FIG. 14 is a left side view of the present invention shown with the tailgate and tarp cover in the position shown in FIG. 11. FIG. 15 is a right side view of the present invention shown with the tailgate and tarp cover in the position shown in FIG. 11. FIG. 16 is a perspective view of the present invention shown with the tailgate partially open and the tarp cover fully open.

Figure 17:
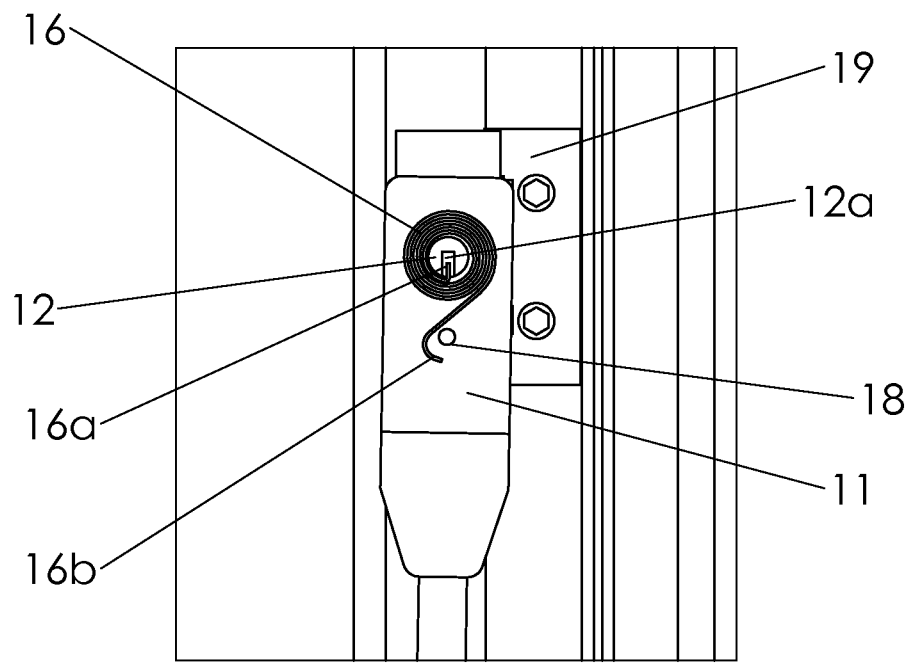
FIG. 17 is a detail view of the torsion spring of the present invention shown with the tarp cover in the position shown in FIG. 1.
Figure 18:
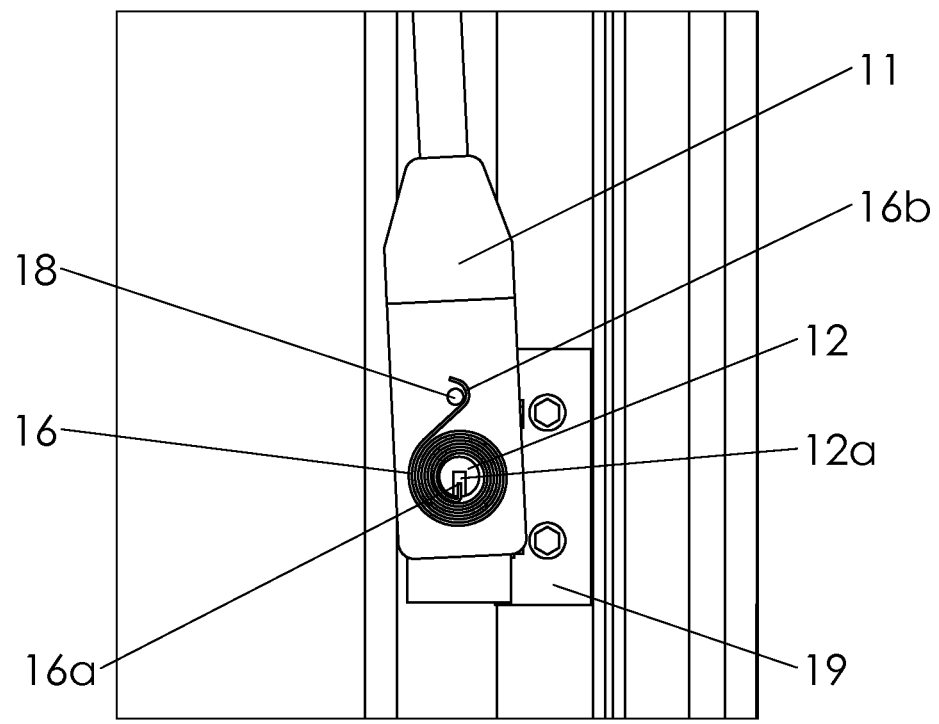
FIG. 18 is a detail view of the torsion spring of the present invention shown with the tarp cover in the position shown in FIG. 11.

FIG. 17 is a detail view of the torsion spring of the present invention shown with the tarp cover in the position shown in FIG. 1. FIG. 18 is a detail view of the torsion spring of the present invention shown with the tarp cover in the position shown in FIG. 11. As shown in these figures, each torsion spring 16 comprises a first end 16a that is inserted into a slot 12a in the torsion spring axle 12 and a second end 16b that wraps around the torsion spring catch rod 18. In the position shown in FIG. 17, the second end 16b of the torsion spring 16 has not caught on the catch rod 18; however, as the two-piece bracket 11 swings around to the position shown in FIG. 18, the second end 16b of the torsion spring catches on the catch rod 18 and is at its maximum tension when the tarp cover is fully opened, as shown in FIG. 18.

Figure 19:
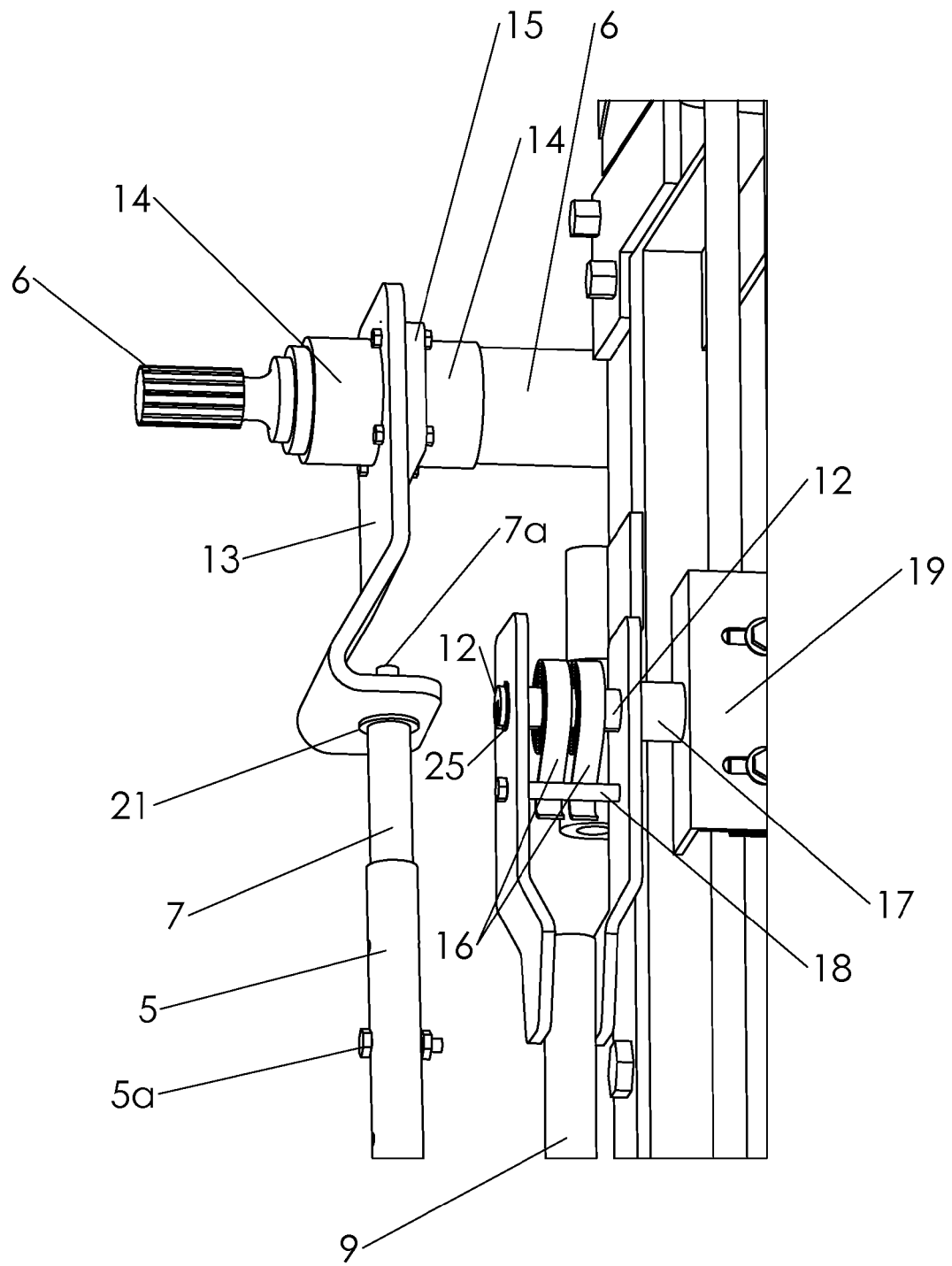
FIG. 19 is a detail view of the top bracket of the present invention.

FIG. 19 is a detail view of the top bracket of the present invention. All of the parts shown in this figure have been previously described.

Figure 20:
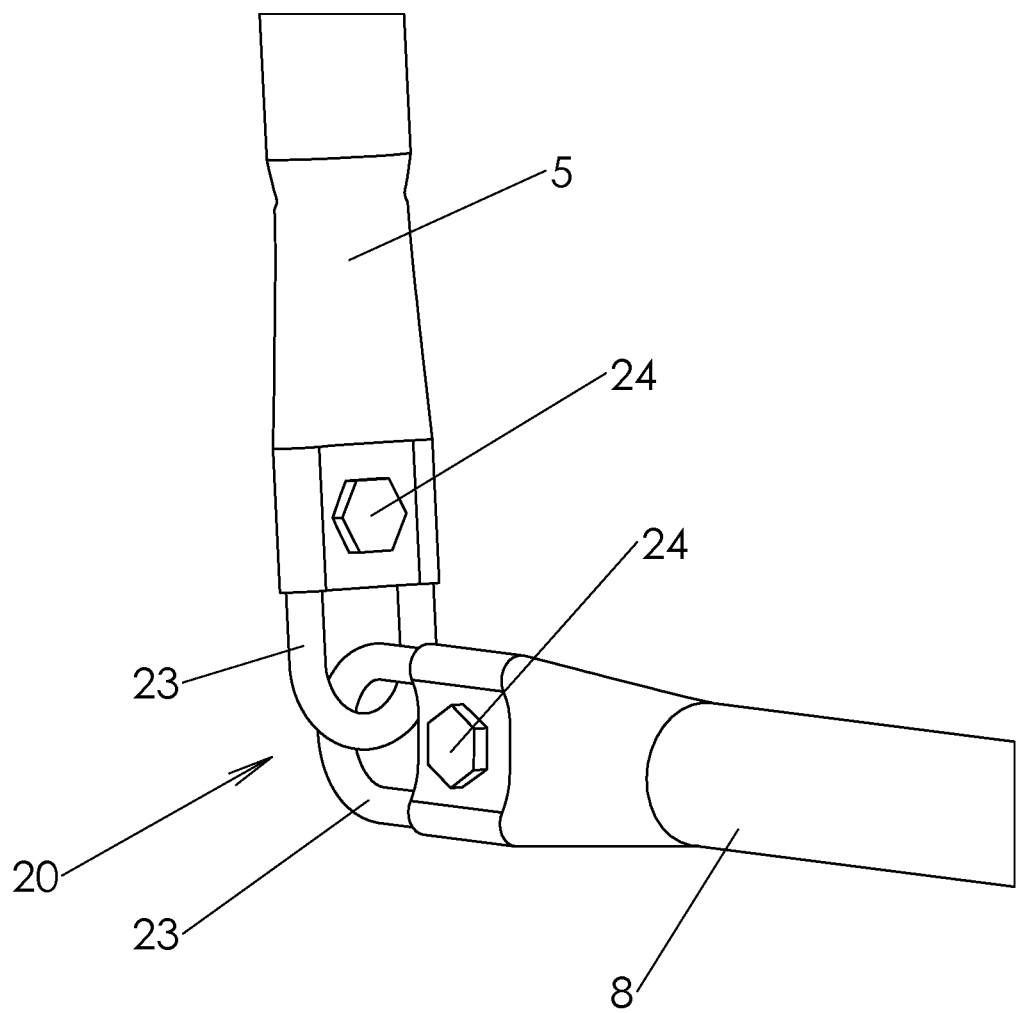
FIG. 20 is a detail view of the pivot point of the present invention.

FIG. 20 is a detail view of the pivot point of the present invention. In one embodiment, the pivot point 20 comprises two chain links 23 that are inserted into the ends of the first and second arms 5, 8, respectively, and secured with bolts 24. This particular embodiment represents a simple pivot means that is relatively inexpensive and easy to manufacture. The present invention is not limited to any particular pivot means, however, and other suitable pivot means may be used. For example, a universal joint or swivel ball joint could be used in lieu of the chain link pivot means shown.

Figure 21:
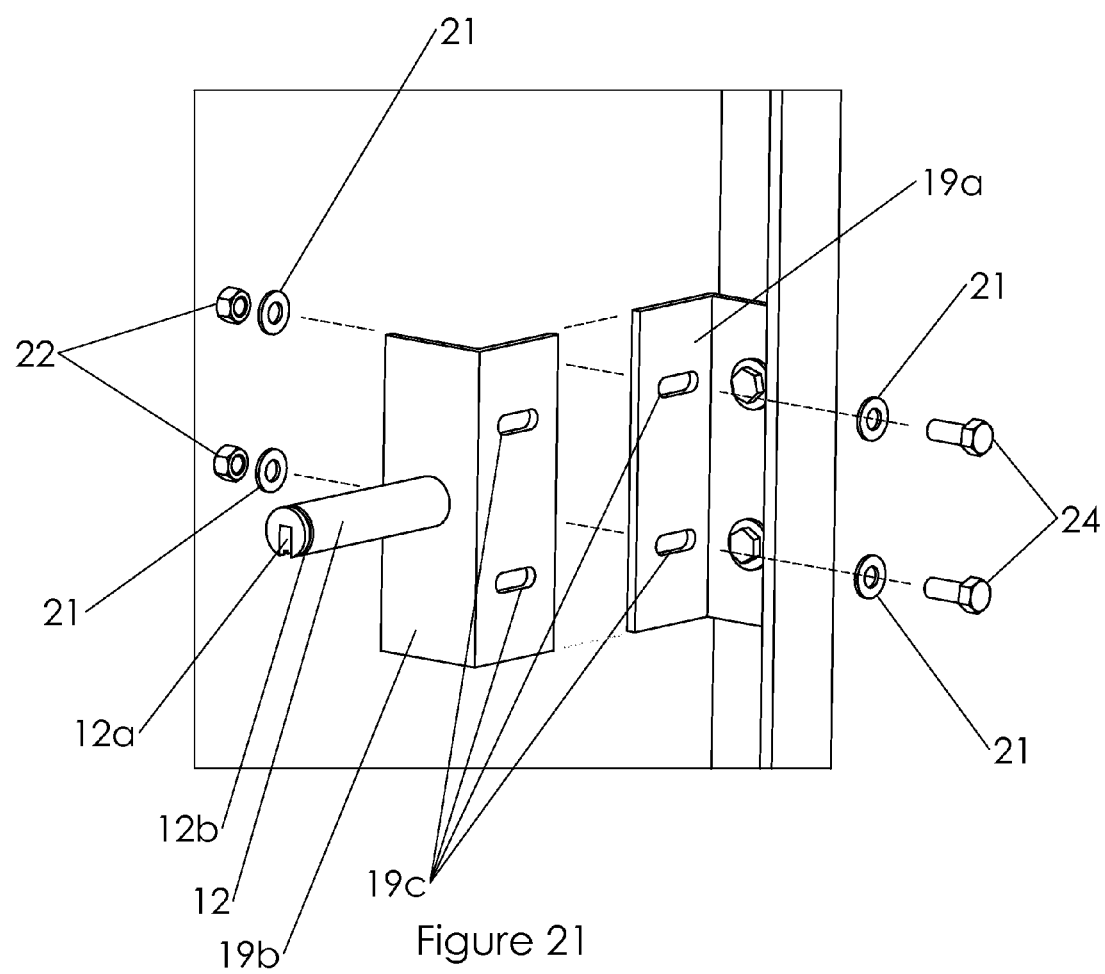
FIG. 21 is a detail view of the mounting bracket of the present invention.

FIG. 21 is a detail view of the mounting bracket of the present invention. As shown in this figure, the mounting bracket 19 preferably comprises two support members 19a, 19b that are comprised of a first plate at a ninety-degree (90°) angle to a second plate. In the case of the first support member 19a, the first and second plates preferably comprise one or more slots 19c through which bolts 24 are inserted. These bolts 24 secure the first support member 19a to the left door of the tailgate 4a and also to the second support member 19b. in the case of the second support member 19b, the torsion spring axle 12 extends outwardly from the second plate, and the second plate preferably comprises one or more slots 19c through which bolts 24 are inserted. These bolts 24 24 secure the second support member 19b to the first support member 19a. The reason the support brackets 19a, 19b preferably comprise slots is to allow the support members to be adjusted relative to one another to accommodate different tailgate configurations.

Figure 22A:
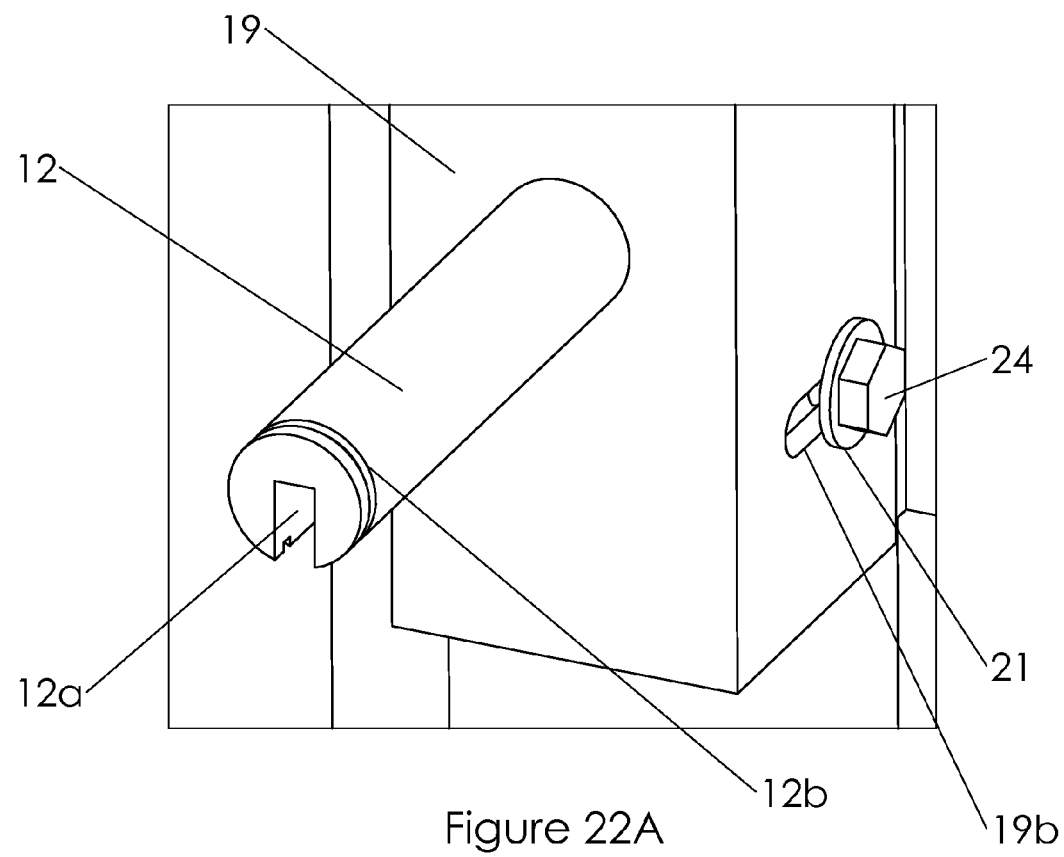
FIG. 22A is a detail view of the torsion spring axle.
Figure 22B:
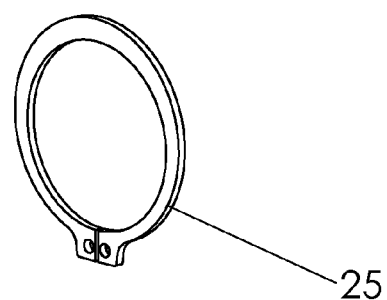
FIG. 22B is a perspective view of the external retaining ring.

FIG. 22A is a detail view of the torsion spring axle, and FIG. 22B is a perspective view of the external retaining ring. As shown in these two figures, the torsion spring axle 12 comprises a circumferential channel 12b into which the external retaining ring 25 is inserted. This external retaining ring 25 keeps the two-piece bracket 11 from moving laterally relative to the torsion spring axle 12 (see FIG. 19).

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A rear arm assembly for a tarp cover system comprising a main roller arm, the rear arm assembly comprising:
   (a) a first arm that is secured to the main roller arm of the tarp cover system by a first connecting member;
   (b) a second arm that is pivotally attached to the first arm; and
   (c) a third arm that is connected to the second arm by an L-shaped second connecting member.

2. The rear arm assembly of claim 1, wherein the first arm comprises a plurality of apertures through which one or more bolts may be inserted to adjust the length of the first connecting member relative to the first arm.

3. The rear arm assembly of claim 1, wherein the second arm comprises a plurality of apertures through which one or more bolts may be inserted to adjust the length of the second connecting member relative to the second arm.

4. The rear arm assembly of claim 1, wherein the third arm comprises a plurality of apertures through which one or more bolts may be inserted to adjust the length of the second connecting member relative to the third arm.

5. The rear arm assembly of claim 1, wherein the first connecting member is attached to the main roller arm of the tarp cover system by a top bracket.

6. The rear arm assembly of claim 5, wherein the main roller arm passes through an aperture in the top bracket, wherein a collar surrounds the main roller arm on either side of the top bracket, and wherein the collars rotate with the main roller arm.

7. The rear arm assembly of claim 6, further comprising a synthetic resinous fluorine-containing polymer bushing that is situated on the main roller arm between one of the collars and the top bracket.

8. The rear arm assembly of claim 7, wherein the top bracket comprises a vertical portion that extends downward from the main roller arm and terminates in an angled portion that extends outward from the vertical portion at a roughly forty-five degrees; wherein the vertical portion has a vertical axis; wherein the angled portion of the vertical portion terminates in a horizontal portion that extends back toward the vertical axis of the vertical portion at a roughly forty-five-degree angle relative to the angled portion; wherein the first connecting member has a top; and wherein the top of first connecting member is situated directly underneath the bushing.

9. The rear arm assembly of claim 1, further comprising a two-piece bracket that is secured to the third arm and that surrounds a torsion spring axle.

10. The rear arm assembly of claim 9, wherein the torsion spring axle comprises a circumferential channel into which an external retaining ring is inserted; wherein one of the two support pieces comprising the two-piece bracket comprises an outer face; and wherein the external retaining ring is situated on the outer face of the support piece.

11. The rear arm assembly of claim 9, further comprising a mounting bracket comprising a first support member and a second support member, each of which comprises a first plate at a ninety-degree angle to a second plate; wherein the first and second plates of the first supporting member comprise one or more slots through which bolts are inserted to secure the first support member to a tailgate and to the second support member; wherein the torsion spring axle extends outwardly from the first plate of the second support member; and wherein the second plate of the second support member comprises one or more slots through which bolts are inserted to secure the second support member to the first support member.

12. The rear arm assembly of claim 9, wherein the first connecting member is attached to the main roller arm of the tarp cover system by a top bracket; wherein the top bracket pivots on the main roller arm; wherein the first arm pivots relative to second arm at a pivot point; and wherein the two-piece bracket pivots on the torsion spring axle.

13. The rear arm assembly of claim 9, further comprising one or more torsion springs situated on the torsion spring axle.

14. The rear arm assembly of claim 13, wherein the third arm has a top; wherein the two-piece bracket comprises two support pieces, each having a top portion and a bottom portion; wherein the bottom portion of each support piece is welded to the top of the third arm; and wherein the torsion spring axle extends through the top portion of each of the two support pieces.

15. The rear arm assembly of claim 14, wherein a torsion spring catch rod extends between the two support pieces that comprise the two-piece bracket; and wherein each torsion spring comprises a first end that is inserted into a slot in the torsion spring axle and a second end that wraps around the torsion spring catch rod.

16. The rear arm assembly of claim 14, further comprising a collar that surrounds the torsion spring axle and is situated between one of the two support pieces that comprises the two-piece bracket and a mounting bracket that mounts the rear arm assembly to the tailgate.

17. A rear arm assembly for a tarp cover system comprising a main roller arm, the rear arm assembly comprising:
   (a) a first arm that is secured to the main roller arm of the tarp cover system; and
   (b) a second arm with two ends, wherein one end of the second arm is pivotally attached to the first arm, wherein the other end of the second arm is attached to a bracket that holds a torsion spring axle, wherein the second arm comprises a roughly ninety-degree bend, wherein one or more torsion springs are situated on the torsion spring axle, and wherein the torsion spring axle is connected to a mounting bracket that is secured to a three-piece tailgate;

wherein the rear arm assembly is not attached to the tailgate at any point other than at the mounting bracket.

* * * * *